(12) United States Patent
Kupratis

(10) Patent No.: US 8,516,789 B2
(45) Date of Patent: Aug. 27, 2013

(54) GAS TURBINE ENGINE WITH AFT CORE DRIVEN FAN SECTION

(75) Inventor: Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 21 days.

(21) Appl. No.: 13/190,595

(22) Filed: Jul. 26, 2011

(65) Prior Publication Data

US 2013/0025286 A1 Jan. 31, 2013

(51) Int. Cl.
*F02K 3/065* (2006.01)

(52) U.S. Cl.
USPC .......................................... 60/226.1; 60/791

(58) Field of Classification Search
USPC .......... 60/226.1–226.3, 262, 39.15, 791–792, 60/224, 39.42, 805
See application file for complete search history.

(56) References Cited

U.S. PATENT DOCUMENTS

| | | | |
|---|---|---|---|
| 2,454,738 A | 11/1948 | Hawthorne | |
| 2,504,181 A | 4/1950 | Constant | |
| 2,546,420 A | 3/1951 | Barr | |
| 2,704,434 A | 3/1955 | Schmitt | |
| 3,131,536 A * | 5/1964 | Snell | 60/226.1 |
| 3,589,132 A | 6/1971 | DuPont | |
| 3,779,486 A | 12/1973 | Lewis et al. | |
| 4,055,949 A * | 11/1977 | Boudigues | 60/269 |
| 4,765,135 A | 8/1988 | Lardellier | |
| 6,209,311 B1 * | 4/2001 | Itoh et al. | 60/226.3 |
| 7,134,271 B2 * | 11/2006 | Baughman et al. | 60/226.1 |
| 7,237,378 B2 * | 7/2007 | Lardellier | 60/226.1 |
| 2011/0056208 A1 | 3/2011 | Norris et al. | |

OTHER PUBLICATIONS

Swedish Defence Research Agency, FOI-R-1563_SE, pp. 24.36, Jun. 2005.
http://www.aviationweek.com/aw/blogs/defense/index.jsp, ADVENT on Show, Aug. 2009.
The Advent of a Better Jet Engine?, Oct. 1, 2007, Defense Industry Daily.
Adaptive Versatile Engine Technology, Wikipedia, Aug. 2010.
General Electric YF120, Wikipedia, Apr. 2011.
Air Force Plans to Develop Revolutionary Engine, Wright-Patterson Air Force Base, dated Apr. 11, 2007.
The Future of the Jet Engine, M.J. Benzakein, GE Aircraft Engines, May 2006.
Design of a Turbofan Engine Cycle with Afterburner for a Conceptual UAV, Bjorn Montgomerie, Scientific Report, Dec. 2005.
Numerical Simulation of the RTA Combustion Rig, F. Davoudzadeh, R. Buehrle, N. Liu, R. Winslow, dated Aug. 2005.

* cited by examiner

*Primary Examiner* — Andrew Nguyen
(74) *Attorney, Agent, or Firm* — Carlson, Gaskey & Olds, P.C.

(57) ABSTRACT

A gas turbine engine includes a low spool along an engine axis with a forward fan section and a low pressure turbine section. A high spool along the engine axis with a high pressure turbine section and an aft core driven fan section (CDFS), the aft core driven fan section (CDFS) axially aft of the high pressure turbine section along the engine axis.

17 Claims, 4 Drawing Sheets

GAS TURBINE ENGINE WITH AFT CORE DRIVEN FAN SECTION

BACKGROUND

The present disclosure relates to gas turbine engines, and more particularly to a gas turbine engine with a reverse-flow core.

Variable cycle engines power high performance aircraft over a range of operating conditions yet achieve countervailing objectives such as high specific thrust and low fuel consumption. The variable cycle engine essentially alters a bypass ratio during flight to match varying requirements. This facilitates efficient performance over a broad range of altitudes and flight conditions to generate high thrust when needed for high energy maneuvers yet also optimize fuel efficiency for cruise or loiter conditions.

SUMMARY

A gas turbine engine according to an exemplary aspect of the present disclosure includes a low spool along an engine axis with a forward fan section and a low pressure turbine section. A high spool along the engine axis with a high pressure turbine section and an aft core driven fan section (CDFS), the aft core driven fan section (CDFS) axially aft of the high pressure turbine section along the engine axis.

A gas turbine engine according to an exemplary aspect of the present disclosure includes an aft core driven fan section (CDFS) axially aft of a forward fan section, said aft core driven fan section (CDFS) in communication with a third stream exhaust duct.

A method of operating a gas turbine engine according to an exemplary aspect of the present disclosure includes controlling an aft inlet guide vane of an aft core driven fan section (CDFS); and controlling a variable area throat of a third stream exhaust nozzle downstream of the aft core driven fan section.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
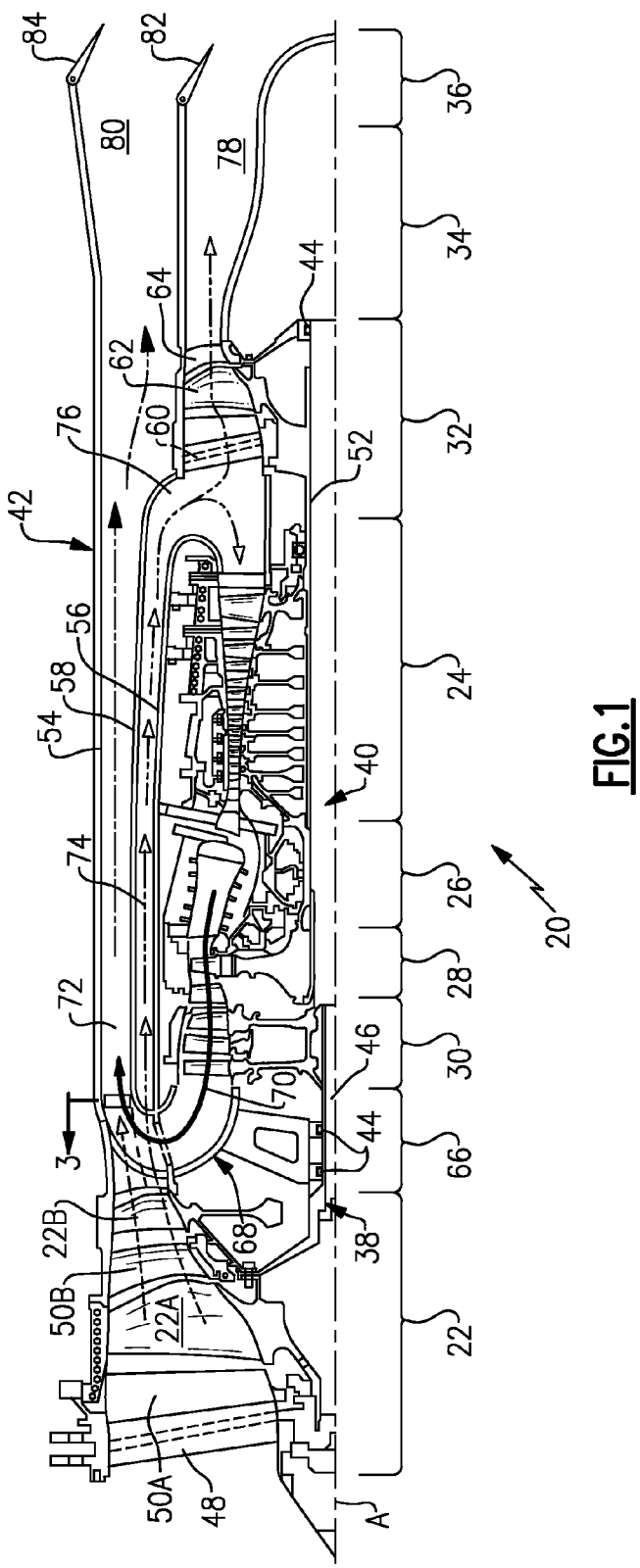
FIG. 1 is a general schematic view an exemplary reverse flow gas turbine engine according to one non-limiting embodiment.

FIG. 1 schematically illustrates a gas turbine engine 20. The gas turbine engine 20 is disclosed herein as a two-spool turbofan that generally incorporates a forward fan section 22, a high pressure compressor section 24, a combustor section 26, a high pressure turbine section 28, a low pressure turbine section 30, an aft core driven fan section (CDFS) 32, an exhaust duct section 34 and a nozzle section 36. Additional sections may include an augmentor section (not shown) among other systems or features such as a geared architecture and/or a third spool architecture. The sections are defined along a central longitudinal engine axis A.

The engine 20 generally includes a low spool 38 and a high spool 40 which rotate about the engine central longitudinal axis A relative to an engine case structure 42 via several bearing systems 44. It should be understood that various bearing systems at various locations may alternatively or additionally be provided.

The forward fan section 22 and the low pressure turbine section 30 are coupled by a low shaft 46 to define the low spool 38. In the disclosed non-limiting embodiment, the forward fan section 22 includes two stages with an inlet guide vane 48, a first fan stator 50A, a first fan rotor 22A, a second fan stator 50B and a second fan rotor 22B. It should be understood that other fan stage architectures may alternatively or additionally be provided.

The high pressure compressor section 24, the combustor section 26 and the high pressure turbine section 28 are referred to herein as a reverse core as the high pressure turbine section 28 is arranged mechanically axially forward along the engine axis A of the combustor section 26 while the high pressure compressor section 24 is arranged mechanically axially aft along the engine axis A of the combustor section 26. The high pressure compressor section 24, the high pressure turbine section 28 and the aft core driven fan section (CDFS) 32 are coupled by a high shaft 52 to define the high spool 40.

The engine case structure 42 generally includes an outer case structure 54, an inner case structure 56 and a third stream case structure 58 radially between the outer case structure 54 and the inner case structure 56. It should be understood that various structures individual or collectively within the engine may define the case structures 54, 56, 58 to essentially define an exoskeleton that supports the spools 38, 40 for rotation therein.

The aft core driven fan section (CDFS) 32 is located generally within the outer case structure 54 radially between the third stream structure 58 and the inner case structure 56. The aft core driven fan section (CDFS) 32 is the axially aftmost rotary section of the high spool 40 and may be generally positioned along the exhaust duct section 34.

The aft core driven fan section (CDFS) 32 generally includes an aft inlet guide vane 60, an aft fan rotor 62 and an aft fan stator 64. The aft inlet guide vane 60 and the aft fan stator 64 may at least partially support the inner case structure 56 relative to the third stream case structure 58. The aft inlet guide vane 60 also facilitates adjustment of the swirl into the aft fan rotor 62 without adverse effect on the high pressure compressor section 24 as the aft core driven fan section (CDFS) 32 is mechanically axially aftward thereof. That is, the aft inlet guide vane 60 may be readily adjusted without flow effect upon the high pressure compressor section 24 as the aft inlet guide vane 60 is mechanically aft thereof.

The engine case structure 42 further includes a radial support structure referred to herein as a Fan Exit Guide Vane (FEGV) structure 66 located axially between the forward fan section 22 and the low pressure turbine section 30. The FEGV structure 66 is illustrated somewhat schematically, but may form at least partially hollow struts which integrate, for example, the case structures 54, 56, 58 with a bearing system to facilitate forward support of the spools 38, 40. The FEGV structure 66 provides a forward radial support for the outer case structure 54 and the inner case structure 56 and the third stream case structure 58 as well as provide a turning flow path 68 from a core flow path 70 to a mixed flow path 72.

A third stream flow path 74 is defined radially inward of the mixed flow path 72 to a split 76 then continues to the core flow path 70 as well as to the aft core driven fan section (CDFS) 32 thence through a third stream exhaust 78 radially inward of the mixed flow exhaust 80 in the exhaust duct section 34.

The nozzle section 36 may include a third stream exhaust nozzle 82 (illustrated schematically) and the mixed flow exhaust nozzle 84. It should be understood that various variable, convergent/divergent, two-dimensional and three-dimensional nozzle systems may be utilized herewith.

Figure 2:
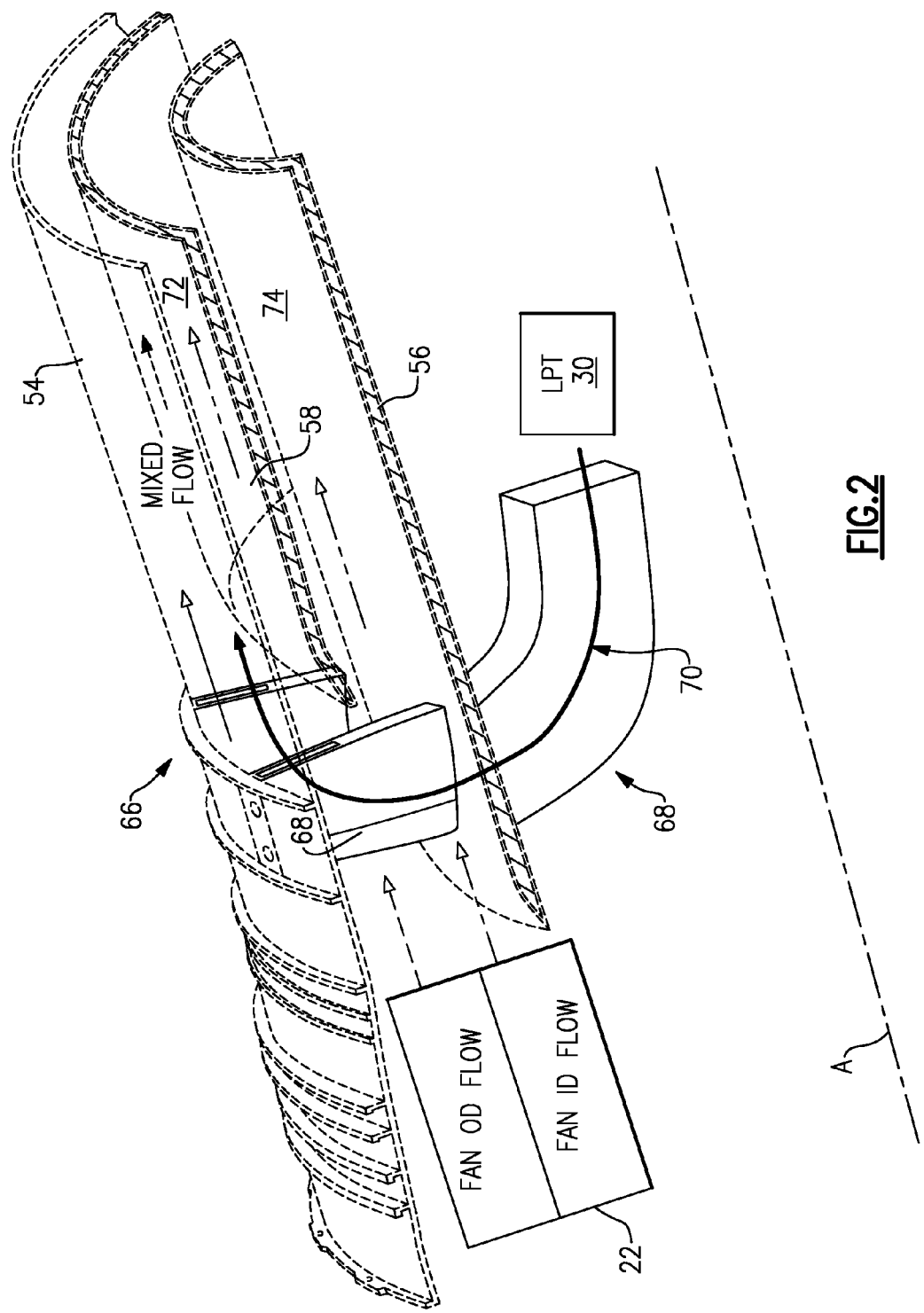
FIG. 2 is an expanded schematic view of a Fan Exit Guide Vane (FEGV) structure.

Air which enters the fan section 22 is divided between a mixed flow along the mixed flow path 72 and a third stream flow along the third stream flow path 74 (FIG. 2). In this non-limiting embodiment, the mixed flow path 72 is arranged as an annulus just within the inner diameter (ID) of the outer case structure 54 and radially outward of the third stream flow path 74. That is, fan air primarily from the inner diameter of the fan section 22 is used to supercharge the high pressure compressor section 24 as the third stream flow from the third stream flow path 74.

The third stream flow from the third stream flow path 74 is communicated to the split 76 thence aftward through the aft core driven fan section (CDFS) 32 as well as forward into the core flow path 70 as reverse core flow. The reverse core flow is compressed by the high pressure compressor section 24, mixed and burned with fuel within the combustor section 26, then expanded over the high pressure turbine section 28 and the low pressure turbine section 30 to generate a relatively hot combustion gas core flow. The turbines 30, 28 rotationally drive the respective low spool 38 and high spool 40 in response to expansion of the hot combustion gas core flow in the reverse core flow arrangement. That is, the reverse core flow flows in a direction generally parallel to the axis A but opposite that of the mixed flow as well as the third stream flow upstream of the split 76 and downstream of the aft core driven fan section (CDFS) 32.

Figure 3:
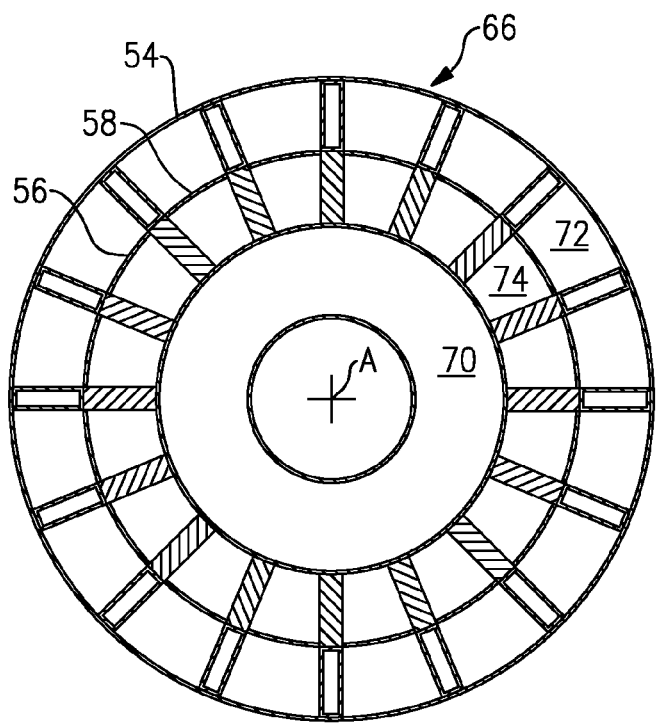
FIG. 3 is a sectional view of the Fan Exit Guide Vane (FEGV) of FIG. 2.

The FEGV structure 66 reorients the relatively hot combustion gas core flow from the combustor section 26 and turbines 28, 30 into the mixed flow path 72 downstream of the fan section 22 (FIG. 2). That is, the mixed flow is "mixed" because it includes both the relatively hot combustion gas core flow and the relatively cool fan flow from the fan section 22—in this non-limiting embodiment primarily from the OD of the fan section 22. The FEGV structure 66 turns the combustion gas core flow essentially one hundred and eighty (180) degrees. The FEGV structure 66 also provides for de-swirl thru flow of the relatively cool fan air which is divided into the mixed flow along the mixed flow path 72 and the third stream flow along the third stream flow path 74 (FIG. 3). That is, the FEGV structure 66 turns the combustion gas core flow to join with the mixed flow path 72 which is arranged as a radially outermost annulus just within the inner diameter (ID) of the outer case structure 54 and radially outward of the third stream flow path—74.

The third stream flow from the third stream path 74 is advantageously arranged through an annulus radially within the mixed flow path 72 which is essentially the inner diameter (ID) of the fan section 22 and is relatively lower in pressure than the OD of the fan section 22 which sources the mixed flow path 72.

The combustion gas core flow is mixed with the fan OD flow to quench the temperature of the combustion gas core from downstream of the turbines 28, 30. The third stream exhaust 78 is radially inboard of the mixed flow exhaust 80. The third stream exhaust 78 is radially closer to the engine axis A to essentially sheath the reverse flow core.

The aft core driven fan section (CDFS) 32 selectively lowers the inlet temperature to the high pressure compressor section 24 as well as increases the pressure ratio of the third stream flow to facilitate a relatively smaller reverse flow core. The power demanded by the aft core driven fan section (CDFS) 32 and the thrust contribution of the aft core driven fan section (CDFS) 32 may be selectively controlled by a combination of the aft inlet guide vane 60 and a variable area throat provided by the third stream exhaust nozzle 82.

For high power, the combustor section 26 fuel flow is increased, the aft inlet guide vane 60 is closed, and the third stream exhaust nozzle 82 is closed to minimize the aft core driven fan section (CDFS) 32 air flow and maximize the pressure ratio of the aft core driven fan section (CDFS) 32. This is the high specific thrust mode. One benefit thereof is the work on the high spool 40 is increased and the high pressure turbine section 28 exit temperature (T4.5) is lower compared to an engine without the aft core driven fan section (CDFS) 32.

For cruise power, the combustor section 26 fuel flow is decreased, the aft inlet guide 60 is opened, and the third stream exhaust nozzle 82 throat area is opened to reduce the power demand of the aft core driven fan section (CDFS) 32 such that the high spool 40 runs relatively faster for a given fuel flow rate to the combustor section 26. Running the high spool 40 faster increases the engine overall pressure ratio which is more efficient. Further, increased flow at a lower pressure ratio through the third stream exhaust nozzle 82 is relatively more efficient as a propulsor at cruise power.

Figure 4:
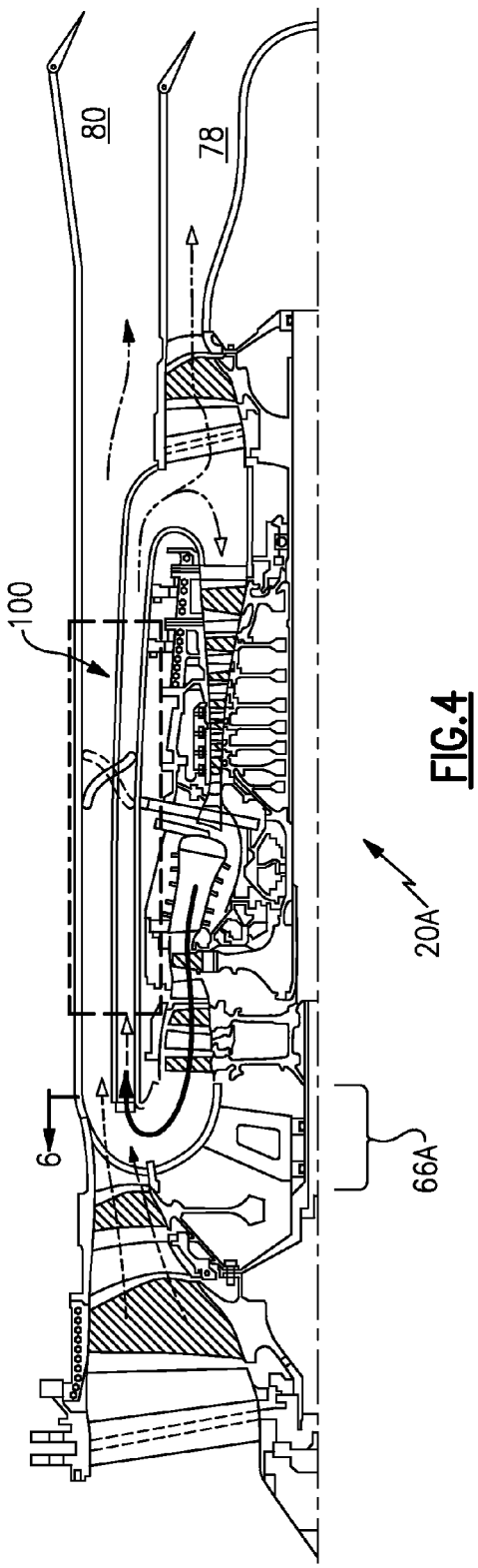
FIG. 4 is a general schematic view of an exemplary reverse flow gas turbine engine according to another non-limiting embodiment.
Figure 5:
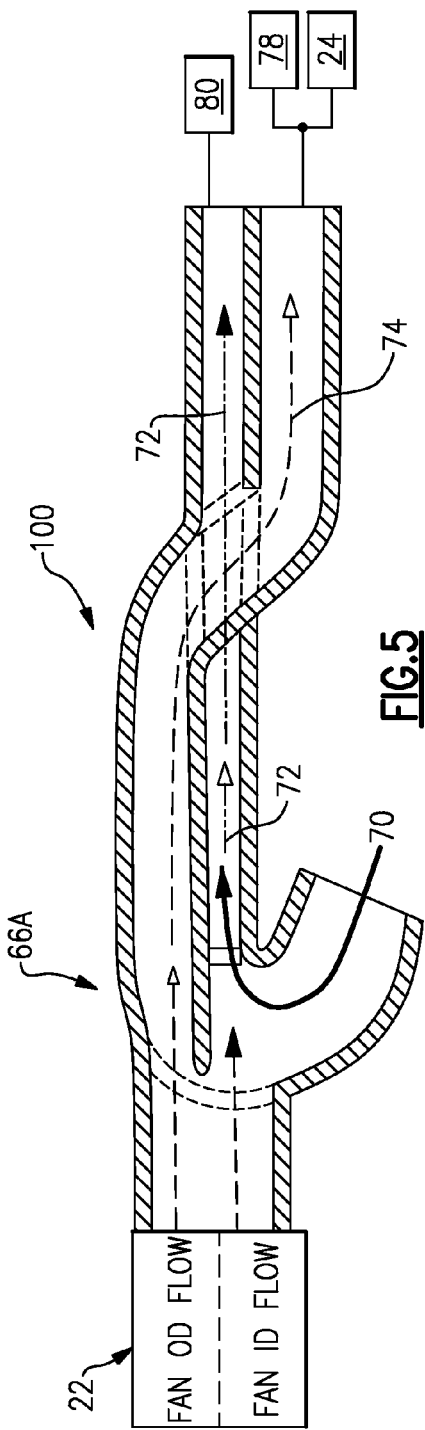
FIG. 5 is an expanded schematic view of another Fan Exit Guide Vane (FEGV) structure and downstream and flow interchange.

With reference to FIG. 4, another gas turbine engine 20A with a reverse flow core is generally as described above but with a flow interchange 100 (FIG. 5) downstream of the FEGV structure 66A. The flow interchange 100 may be defined by the FEGV structure 66A or may be located downstream thereof as separate duct sections formed by the engine case structure 42.

Figure 6:
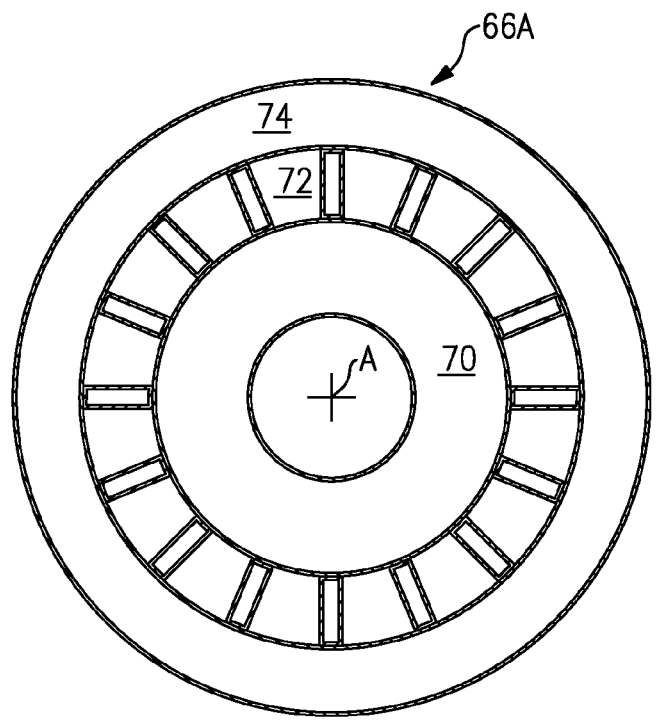
FIG. 6 is a sectional view of the Fan Exit Guide Vane (FEGV) of FIG. 5.

The FEGV structure 66A turns the combustion gas core flow to initially join with fan flow primarily from the inner diameter (ID) of the fan section 22 (FIG. 6) to provide the mixed flow. The flow interchange 100 (FIG. 5) then crosses the mixed flow of the combustion gas core flow and the ID fan air with the OD fan air which becomes the third stream flow such that the mixed flow exhaust 80 is radially outboard of the third stream exhaust 78 as described above. The radially outermost mixed flow exhaust 80 is arranged as an annulus just within the inner diameter (ID) of the outer case structure 54 and radially outward of the third stream exhaust 78. That is, the relatively higher pressure ratio fan air from the outer diameter (OD) of the fan section 22—as compared to the relatively lower pressure ratio fan air from the inner diameter (ID) of the fan section 22 (FIG. 1)—is used as third stream flow to supercharge the high pressure compressor section 24 through the flow interchange 100.

It should be understood that relative positional terms such as "forward," "aft," "upper," "lower," "above," "below," and the like are with reference to the engine but should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
    a low spool along an engine axis with a forward fan section and a low pressure turbine section;
    a high spool along said engine axis with a high pressure turbine section, a high pressure compressor section and an aft core driven fan section (CDFS), said high pressure turbine section axially forward of said high pressure compressor section, said aft core driven fan section (CDFS) axially aft of said high pressure turbine section and said high pressure compressor section along said engine axis, and said aft core driven fan section (CDFS) including a forward-facing inlet; and
    a combustor section axially between said high pressure turbine section and said high pressure compressor section.

2. The gas turbine engine as recited in claim 1, wherein said forward fan section includes a multiple of stages.

3. The gas turbine engine as recited in claim 1, wherein said low pressure turbine section is axially aft of said forward fan section.

4. The gas turbine engine as recited in claim 1, further comprising a Fan Exit Guide Vane (FEGV) structure located axially between said forward fan section and said low pressure turbine section.

5. The gas turbine engine as recited in claim 4, wherein said Fan Exit Guide Vane (FEGV) structure mixes a combustion gas core flow from said high pressure turbine section with a fan air from an outer diameter of said forward fan section.

6. The gas turbine engine as recited in claim 5, further comprising a third stream flow primarily sourced from an inner diameter of said forward fan section.

7. A gas turbine engine comprising:
    a low spool along an engine axis with a forward fan section and a low pressure turbine section;
    a high spool along said engine axis with a high pressure turbine section and an aft core driven fan section (CDFS), said aft core driven fan section (CDFS) axially aft of said high pressure turbine section along said engine axis;
    a Fan Exit Guide Vane (FEGV) structure located axially between said forward fan section and said low pressure turbine section, said Fan Exit Guide Vane (FEGV) structure mixes a combustion gas core flow from said high pressure turbine section with a fan air from an outer diameter of said forward fan section; and
    a third stream flow primarily sourced from an inner diameter of said forward fan section, wherein said third stream flow is split between said aft core driven fan section (CDFS) and a high pressure compressor axially forward of said aft core driven fan section (CDFS).

8. The gas turbine engine as recited in claim 1, wherein said aft core driven fan section (CDFS) is radially between an inner case structure and a third stream case structure which form a third stream exhaust duct.

9. The gas turbine engine as recited in claim 8, wherein said third stream exhaust duct is radially inward of a mixed flow exhaust duct.

10. A gas turbine engine comprising:
    a forward fan section in communication with a third stream flow path, a third stream exhaust duct, and a mixed flow exhaust duct;
    a compressor section arranged in receiving flow communication with said third stream flow path;
    a combustor section arranged in receiving flow communication with said third stream flow path;
    a turbine section arranged in receiving flow communication with said combustor section and located forward of said compressor section;
    an aft core driven fan section (CDFS) axially aft of said compressor section, said aft core driven fan section (CDFS) in communication with said third stream exhaust duct, and said aft core driven fan section (CDFS) including an inlet guide vane and a rotor, said vane being adjustable between open and closed positions, said closed position configured to divert flow from said third stream exhaust duct to an inlet of said compressor section.

11. The gas turbine engine as recited in claim 10, wherein said aft core driven fan section (CDFS) includes the inlet guide vane radially between an inner case structure and a third stream case structure which forms said third stream exhaust duct.

12. The gas turbine engine as recited in claim 10, wherein said mixed flow exhaust duct is radially outward of said third stream exhaust duct.

13. The gas turbine engine as recited in claim 1, wherein said aft core driven fan section (CDFS) includes a vane and a rotor, said vane being adjustable between open and closed positions, said closed position diverting a third stream exhaust to an inlet of said high pressure compressor section.

14. The gas turbine engine as recited in claim 1, wherein said forward fan section is in communication with a third stream flow path, a third stream exhaust duct, and a mixed flow exhaust duct, said high pressure turbine section being arranged to discharge into said mixed flow exhaust duct.

15. The gas turbine engine as recited in claim 14, wherein said high pressure compressor section is arranged in receiving flow communication with said third stream flow path.

16. The gas turbine engine as recited in claim 14, wherein said aft core driven fan section (CDFS) is in exclusive flow communication with said third stream exhaust duct.

17. The gas turbine engine as recited in claim 14, wherein said third stream exhaust duct is radially inwards of said mixed flow exhaust duct.

* * * * *